(12) United States Patent
Ganille et al.

(10) Patent No.: US 11,629,976 B2
(45) Date of Patent: Apr. 18, 2023

(54) GUIDANCE METHOD AND SYSTEM FOR ASSISTING IN FOLLOWING A TRAJECTORY FOR VELOCITY-VECTOR PILOTING OF AN AIRCRAFT

(71) Applicant: THALES, Courbevoie (FR)

(72) Inventors: Thierry Ganille, Merignac (FR); Florent Mennechet, Merignac (FR); Xavier Servantie, Merignac (FR)

(73) Assignee: THALES, Courbevoie (FR)

( * ) Notice: Subject to any disclaimer, the term of this patent is extended or adjusted under 35 U.S.C. 154(b) by 612 days.

(21) Appl. No.: 16/706,484

(22) Filed: Dec. 6, 2019

(65) Prior Publication Data

US 2020/0191604 A1 Jun. 18, 2020

(30) Foreign Application Priority Data

Dec. 18, 2018 (FR) ...................................... 1873108

(51) Int. Cl.
*G01C 23/00* (2006.01)
*B64D 43/00* (2006.01)

(52) U.S. Cl.
CPC ........... *G01C 23/005* (2013.01); *B64D 43/00* (2013.01)

(58) Field of Classification Search
None
See application file for complete search history.

(56) References Cited

U.S. PATENT DOCUMENTS

| 7,508,322 | B1* | 3/2009 | Krenz | G01C 23/00 340/975 |
| 2003/0222887 | A1* | 12/2003 | Wilkins, Jr. | G01C 23/005 345/618 |
| 2005/0273222 | A1* | 12/2005 | Artini | G01C 23/00 701/14 |
| 2013/0096738 | A1 | 4/2013 | Yamasaki | |
| 2017/0323571 | A1* | 11/2017 | Lissajoux | G08G 5/0052 |

FOREIGN PATENT DOCUMENTS

EP 0 967 461 A1 12/1999

* cited by examiner

*Primary Examiner* — Adam D Tissot
*Assistant Examiner* — Garrett F Evans
(74) *Attorney, Agent, or Firm* — BakerHostetler

(57) ABSTRACT

A method for guidance and for assisting in following a trajectory for velocity-vector piloting of an aircraft includes a step of calculating, at all times, lateral and vertical offsets of the current position of the aircraft from a target trajectory, estimated by a flight management system, and then a joining heading and a joining gradient for the aircraft to join the trajectory depending on these offsets; and a following fourth step of displaying, in head-up or head-down form, a consistent guidance symbol centered on the calculated joining heading and the calculated joining gradient for joining the trajectory, on a piloting screen showing a velocity vector. The fourth step may display, in addition to the guidance symbol, one or more items of information anticipating the next trajectory break.

12 Claims, 7 Drawing Sheets

GUIDANCE METHOD AND SYSTEM FOR ASSISTING IN FOLLOWING A TRAJECTORY FOR VELOCITY-VECTOR PILOTING OF AN AIRCRAFT

CROSS-REFERENCE TO RELATED APPLICATIONS

This application claims priority to foreign French patent application No. FR 1873108, filed on Dec. 18, 2018, the disclosure of which is incorporated by reference in its entirety.

FIELD OF THE INVENTION

The present invention relates to a method for guidance and for assisting in following a trajectory for velocity-vector piloting.

The present invention also relates to a corresponding system for guidance and for assisting in following a trajectory for velocity-vector piloting of an aircraft.

BACKGROUND

The invention lies in the technical field of human-machine interfaces HMI for piloting an aircraft having a "velocity" vector, the "velocity" vector being defined as the vector of the velocity of the center of gravity of said aircraft with respect to a local terrestrial reference frame, and being displayed on a worn or non-worn head-down display or head-up display.

In civil aviation, the advent of navigation based on the GPS (Global Positioning System) position of the aircraft has opened up a new field of flight procedures to the IFR (Instrument Flight Rules) instruments by creating new air routes that were previously inaccessible in conditions of degraded visibility. As an example, mention may be made of the RNP 0.3 (Area Navigation Performance 0.3 Nautical Mile tolerance), RNP 0.1 (Area Navigation Performance 0.1 Nautical Mile tolerance), RNP AR (Area Navigation Performance Authorization Required) routes, the LPV (Localizer Performance with GPS-based Vertical Guidance) approaches or else, specifically for helicopters, the PinS (Point in Space in IFR) approaches. Due to their requirement level in terms of following accuracy, these procedures have made it possible for example to define new access routes to airports that avoid the most built-up areas or else to define access routes to airports surrounded by mountains that are able to be used in degraded visibility, or else for helicopters, to define routes connecting hospitals, including in mountainous areas, and able to be used in degraded visibility in this case as well.

In military aviation, numerous piloting cases requiring accurate piloting in order to follow complex trajectories may benefit from assistance. This requires a large amount of cognitive work from the pilot if the carrier does not have autopilot or if this is inoperative.

These requirements in terms of accurately following a 3D route point toward the need for manual piloting assistance that allows these three-dimensional trajectories to be followed with small offsets in comparison with the setpoint trajectory without requiring an increased workload for the pilot.

There are at present several solutions that partially meet this need.

A first solution is that of displaying lateral and vertical offsets on the two lateral and vertical drift scales of the primary flight display PFD. These offsets may be linearized, for example in order to follow a GNSS procedure outside of navigation LPV by way of satellite global positioning, or may be angular in order to follow ILS (Instrument Landing System) or LPV landing guidance. In order to remain on his trajectory, the pilot has to keep the offset symbols at the center of the drift scales.

This first solution, based on the drift scales, provides only two vertical and horizontal offsets with respect to a trajectory, but does not provide any guidance or any assistance in advance of manual piloting.

A second solution is that of displaying a flight director, which may be used on its own or in addition to the lateral and vertical offsets. The flight director is a symbol that provides the flight crew with lateral and vertical maneuvering instructions to be executed in order to follow the desired trajectory. These instructions may be presented in various forms:

guidance bars called "Dual Cue Flight Directors" are two perpendicular segments, one parallel to the horizontal edge of the screen, the other parallel to the vertical edge and intersecting at their centers in the center of the aeroplane reference when the instruction is to fly in a straight line and level. In order to guide the pilot in a climbing right-hand turn, for example, the horizontal bar moves upward in order to tell the pilot to climb and the vertical bar moves to the right in order to tell the pilot to turn right such that, when the aeroplane has taken the correct gradient and the correct roll angle for this climbing turn, the two bars again intersect at their centers in the center of the aeroplane reference.

the "V" shape of the flight director, called "Single Cue Flight Director", is a single instruction that fuses the lateral instruction and the vertical instruction into a single symbol. Its symbol represents a plane in a perspective delta shape that rises and falls so as to give vertical instructions and that tilts to the right or to the left so as to give lateral instructions. It is enough to perform piloting such that the "V"-shaped symbol of the flight director remains level on the aeroplane reference in order to follow the trajectory.

one form of flight director suitable for velocity-vector piloting, called "Flight Path Director", and therefore intended more for head-up displays or for FPD with SVS, synthetic vision system, in which the lateral instruction and the vertical instruction are fused into a single instruction with a single symbol; its symbol is generally a circle with a diameter smaller than that of the velocity vector and, in order to follow the guidance, it is enough to pilot the aircraft such that the velocity vector surrounds the symbol of the flight director.

The two forms of flight director in the second solution, called "dual cue" and "single cue", are indeed appropriate for piloting the aircraft in terms of roll angle and in terms of pitch, but are not very appropriate for piloting with regard to the trajectory and the "velocity" vector.

The third form of flight director in the second solution, called "Flight Path Director", is for its part well-suited to velocity-vector piloting within the rectilinear portions of the trajectory, but, like the first solution and the two first forms of flight director in the second solution, has the drawback of not providing information to the pilot allowing him to anticipate a change in the trajectory, such as for example a turn following a straight portion of the trajectory or a descent following a climb or level flying, resulting in the creation of inaccuracy and an increased workload for following a trajectory in three spatial dimensions.

Another defect with the first and second solutions described above is the lack of conformity of the guidance with respect to the real world in the case of a head-up display or with respect to a synthetic vision system SVS in the case of a head-down display.

A third solution consists in displaying a representation of the trajectory in a consistent manner either superimposed on an SVS for a head-down screen or superimposed on the real world for a worn or non-worn head-up screen. A conventional representation of such a system is to display a sequence of rectangles perpendicular to the trajectory, spaced by a certain fixed distance and of fixed size in the real world, thus forming a kind of tunnel around the trajectory. Reference is made to "Tunnel in the Sky" for this third solution, but other representations may be used, such as for example a route in the sky. When the aircraft is on the trajectory, it is enough to pilot the aircraft such that the velocity vector is at the center of the following rectangle in order to follow the trajectory.

The "Tunnel in the Sky" representations in the third solution are consistent for their part, but do not provide guidance for joining the trajectory when outside the tunnel. These representations may moreover take up a lot of space on the screen, impair the legibility of other guidance information, sometimes be difficult to understand for slightly complex trajectories and lead to a "tunneling" effect, that is to say excessive focusing on this display for their user, to the detriment of monitoring the other flight parameters.

A first technical problem is to provide a method and a system for assisting in the manual velocity-vector piloting of an aircraft in order to follow a 3D three-dimensional spatial trajectory and guidance of the aircraft that is consistent with respect to the real world in the case of a head-up display or with respect to a synthetic vision system SVS in the case of a head-down display.

A second technical problem, linked to the first technical problem, is to provide the pilot with visual guidance information for anticipating a break in the form of the setpoint trajectory to be followed by the aircraft.

SUMMARY OF THE INVENTION

To this end, one subject of the invention is a method for guidance and for assisting in following a trajectory for velocity-vector piloting of an aircraft, comprising the following steps:
a first step of determining a target trajectory of the aircraft;
a second step of measuring the current position and the current attitude of the aircraft; and then
a third step of calculating lateral and vertical offsets of the current position of the aircraft from this trajectory, a joining heading and a joining gradient for the aircraft to join the trajectory; and then
a fourth step of displaying, in head-up or head-down form, a consistent guidance symbol centered on the calculated joining heading and the calculated joining gradient for joining the trajectory, on a piloting screen showing a velocity vector.

According to particular embodiments, the guidance method for assisting in following a trajectory for velocity-vector piloting of an aircraft comprises one or more of the following features taken on their own or in combination:
the target trajectory of the aircraft has one or more trajectory breaks from the set formed by a start of a turn, an end of a turn, a turn radius and/or direction change, a gradient change on its own or in combination with a lateral heading change; and the third step calculates the remaining time before the next break; and the fourth step displays, in addition to the guidance symbol, first information anticipating the next trajectory break with regard to the remaining time until the next break as calculated in third step when the calculated remaining time passes values less than a predetermined period T;

the fourth step displays, in support of the guidance symbol, second information anticipating the next trajectory break with regard to the direction of displacement of the guidance symbol after the next break when the calculated remaining time passes a value less than the predetermined period T;

the fourth step displays, in support of the guidance symbol, fourth information anticipating the next trajectory break with regard to the gradient to be taken after the next break when the calculated remaining time passes a value less than the predetermined period T;

the fourth step displays, in support of the guidance symbol, fifth information anticipating the next trajectory break with regard to the roll angle to be taken after the next break when the calculated remaining time passes a value less than the predetermined period T;

the guidance symbol has an unbroken or dotted shape of a ring with a diameter greater than the width of the velocity vector;

the target trajectory of the aircraft has one or more trajectory breaks from the set formed by a start of a turn, an end of a turn, a turn radius and/or direction change, a gradient change on its own or in combination with a lateral heading change; and when the next trajectory break is in the set formed by a start of a turn, a turn radius and/or direction change, the fourth step displays, in support of the guidance symbol, fifth information anticipating the next trajectory break with regard to the heading to be taken after the next break when the calculated remaining time passes a value less than a predetermined period T;

the target trajectory of the aircraft has one or more trajectory breaks from the set formed by a start of a turn, an end of a turn, a turn radius and/or direction change, a gradient change on its own or in combination with a lateral heading change; and when the next trajectory break is in the set formed by a start of a turn, a turn radius and/or direction change, the fourth step displays first information anticipating the exact moment of the next break by activating an auxiliary symbol for indicating the calculated remaining time, created on the screen when the calculated remaining time passes a value less than a predetermined period T, activated on the screen with a consistent lateral displacement velocity equal to the future displacement velocity V of the guidance symbol during the next turn, and situated on the screen, at the moment when it appears when the calculated remaining time is equal to T, at a distance D from the position of the guidance symbol that is equal to the product of the velocity V and the duration T;

the target trajectory of the aircraft has one or more trajectory breaks from the set formed by a start of a turn, an end of a turn, a turn radius and/or direction change, a gradient change on its own or in combination with a lateral heading change; and when the next trajectory break is in the set formed by a start of a turn, a turn radius and/or direction change, the guidance symbol has a shape that varies depending on the calculated remaining time, the shape of the guidance symbol being a full circle when the calculated remaining time is greater than a predetermined period T; and the shape of the guidance symbol being a dotted circular arc the concavity of which is oriented toward the exit position of the next turn when the calculated remaining time passes the period T by lower values until being canceled out, a first auxiliary symbol being created in parallel, having the shape complementary to the broken circular arc of the guidance symbol and activated with a consistent lateral displacement velocity equal to the future displacement velocity V of the guidance symbol, and a second auxiliary symbol being created in parallel, centered on the exit position of the next turn;

the first step is executed by a flight management system; and the second step is executed by a set of positioning and attitude sensors; and the third step is executed by an electronic guidance computer; and the fourth step is executed by a head-down or head-up piloting screen contained in an SVS, EVS, CVS display system.

Another subject of the invention is a system for guidance and for assisting in following a trajectory for velocity-vector piloting of an aircraft, comprising:

a flight management system of the aircraft, a set of positioning and attitude sensors of the aircraft, a set of at least one display including a piloting screen of the aircraft, and a guidance computer for assisting manual piloting of the aircraft; the flight management system being configured so as to determine and provide a target trajectory of the aircraft; the set of position and attitude sensors being configured so as to provide the kinematics of the aircraft to the guidance computer at all times; the guidance computer being configured so as to calculate, at all times, lateral and vertical offsets of the current position of the aircraft from this trajectory, a joining heading and a joining gradient for the aircraft to join the trajectory from the current position of the aircraft and the target trajectory; the head-down or head-up piloting screen showing a velocity vector being configured so as to display a consistent guidance symbol, centered on the calculated joining heading and calculated joining gradient for joining the trajectory.

According to particular embodiments, the system for guidance and for assisting in following a trajectory for velocity-vector piloting of an aircraft comprises one or more of the following features taken on their own or in combination:

the target trajectory of the aircraft has one or more trajectory breaks from the set formed by a start of a turn, an end of a turn, a turn radius and/or direction change, a gradient change on its own or in combination with a lateral heading change; and the guidance computer is configured so as to calculate the remaining time before the next break, and the control screen is configured so as to display, in support of the guidance symbol: first information anticipating the next trajectory break with regard to the remaining time until the next break calculated when the calculated remaining time passes a value less than a predetermined period T; and/or second information anticipating the next trajectory break with regard to the direction of displacement of the guidance symbol after the next break when the calculated remaining time passes a value less than a predetermined period T; and/or third information anticipating the next trajectory break with regard to the displacement velocity of the guidance symbol after the next break when the calculated remaining time passes a value less than a predetermined period T; and/or fourth information anticipating the next trajectory break with regard to the gradient to be taken after the next break when the calculated remaining time passes a value less than a predetermined period T;

the control screen is configured so as to display, in support of the guidance symbol, fifth information anticipating the next trajectory break with regard to the heading to be taken after the next break when the calculated remaining time passes a value less than the predetermined period T when the next trajectory break is in the set formed by a start of a turn, a turn radius and/or direction change; and/or when the next trajectory break is in the set formed by a start of a turn, a turn radius and/or direction change, the first information anticipating the exact moment of the next break is created by activating an auxiliary symbol indicating the calculated remaining time, created on the screen when the calculated remaining time passes values less than a predetermined period T, activated on the screen with a consistent lateral displacement velocity equal to the future displacement velocity V of the guidance symbol during the next turn, and situated on the screen, at the moment when it appears when the calculated remaining time is equal to T, at a distance D from the position of the guidance symbol that is equal to the product of the velocity V and the duration T.

BRIEF DESCRIPTION OF THE DRAWINGS

The invention will be better understood upon reading the following description of several embodiments, this description being given solely by way of example and with reference to the drawings, in which.

DETAILED DESCRIPTION

The principle of the method and of the system according to the invention for guidance and for assisting in following a trajectory for manual velocity-vector piloting of an aircraft is based on the calculation, at all times by an electronic guidance computer, of the lateral and vertical offsets of the position of the aircraft from a target trajectory in the three-dimensional space of the aircraft, determined for its part by a dedicated computer such as a flight management system FMS, and the calculation of the remaining time before the next break in the trajectory. A joining heading and a joining gradient are calculated from the lateral and vertical offsets, and a consistent guidance symbol, centered on the joining heading and the joining gradient, is displayed as an instruction on the primary piloting screen of the aircraft in head-up or head-down form.

This joining instruction, formed by the guidance symbol, additionally contains intuitive information for anticipating changes in the consistent trajectory followed by the aircraft, in terms of heading and in terms of altitude. This allows highly accurate piloting of the aircraft on the trajectory that is followed, without requiring a significant workload for the pilot.

Moreover, before each break in the form of the trajectory, formed of a sequence of portions or sections, at least one item of information for anticipating the following trajectory portion, following the current trajectory portion, is displayed on this same single guidance or joining symbol a few seconds before the trajectory break, for example a duration T of between 5 seconds and 10 seconds, before the break in the trajectory, but which may differ depending on the type of aircraft and piloting (helicopter versus aeroplane, civil versus military).

Figure 1:
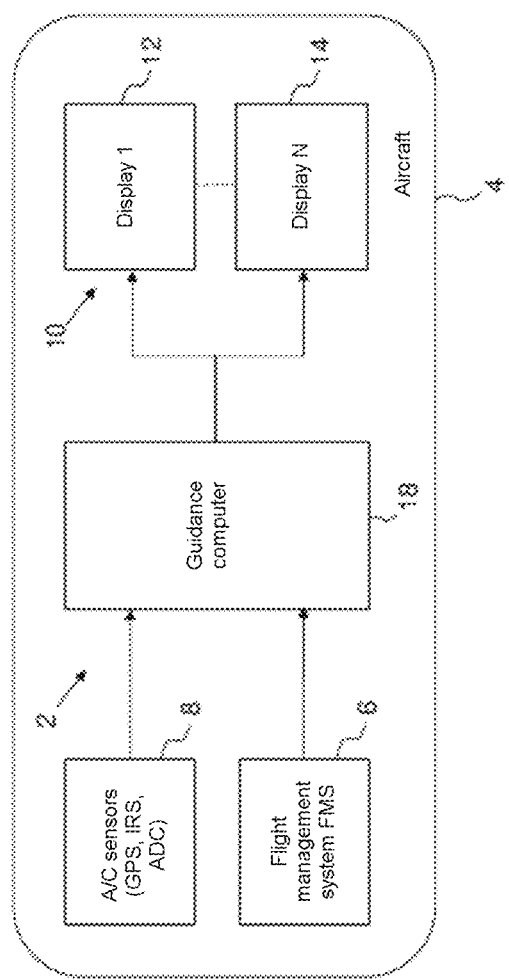
FIG. 1 is a general architectural view of a system according to the invention for guidance and for assisting in following a trajectory for velocity-vector piloting.

According to FIG. 1, a system for assisting in the manual piloting of an aircraft according to the invention in order to consistently follow a three-dimensional spatial trajectory is preferably installed on board said aircraft.

As a variant, the system for assisting in the manual piloting of an aircraft according to the invention in order to consistently follow a three-dimensional spatial trajectory of said aircraft may be remote from said aircraft, the piloting being performed remotely by remote controls. In this case, the aircraft is for example a drone.

According to FIG. 1, a system 2 for guidance and for assisting in following a trajectory for velocity-vector piloting of an aircraft 4 comprises:
 a flight management system FMS 6 of the aircraft 4;
 a set of measurement sensors 8 for measuring, at all times, the kinematics of the aircraft 4 with respect to the ground, in particular the position of the aircraft;
 a set 10 of at least one display 12, 14, including a piloting screen 12 of the aircraft 4; and
 a guidance computer 18 for assisting in the manual piloting of the aircraft 4.

The flight management system FMS 6 is configured so as to determine and provide a target trajectory of the aircraft with respect to the ground.

The set of measurement sensors 8 for measuring the kinematics of the aircraft with respect to the ground is configured so as to provide the position of the aircraft 4 to the guidance computer 18 at all times. It uses for example the GPS satellite global positioning system, the IRS (Initial Reference System), or the ADC (Air Data Computer).

The guidance computer 18 is configured so as to calculate, at all times, lateral and vertical offsets of the current position of the aircraft 4 from this trajectory, a joining heading and a joining gradient for the aircraft to join the trajectory from the current positions and attitudes and the target trajectory.

The head-down or head-up piloting screen 12 showing a velocity vector is configured so as to display a consistent guidance symbol, centered on the calculated joining heading and the calculated joining gradient for joining the trajectory.

The display of the guidance symbol is consistent with respect to a synthetic vision system SVS, an enhanced vision system EVS, a combined vision system CVS combining a synthetic vision system SVS and an enhanced vision system EVS, or consistent with respect to the real world, in the case of a display on a worn or non-worn transparent head-up screen.

Figure 2:
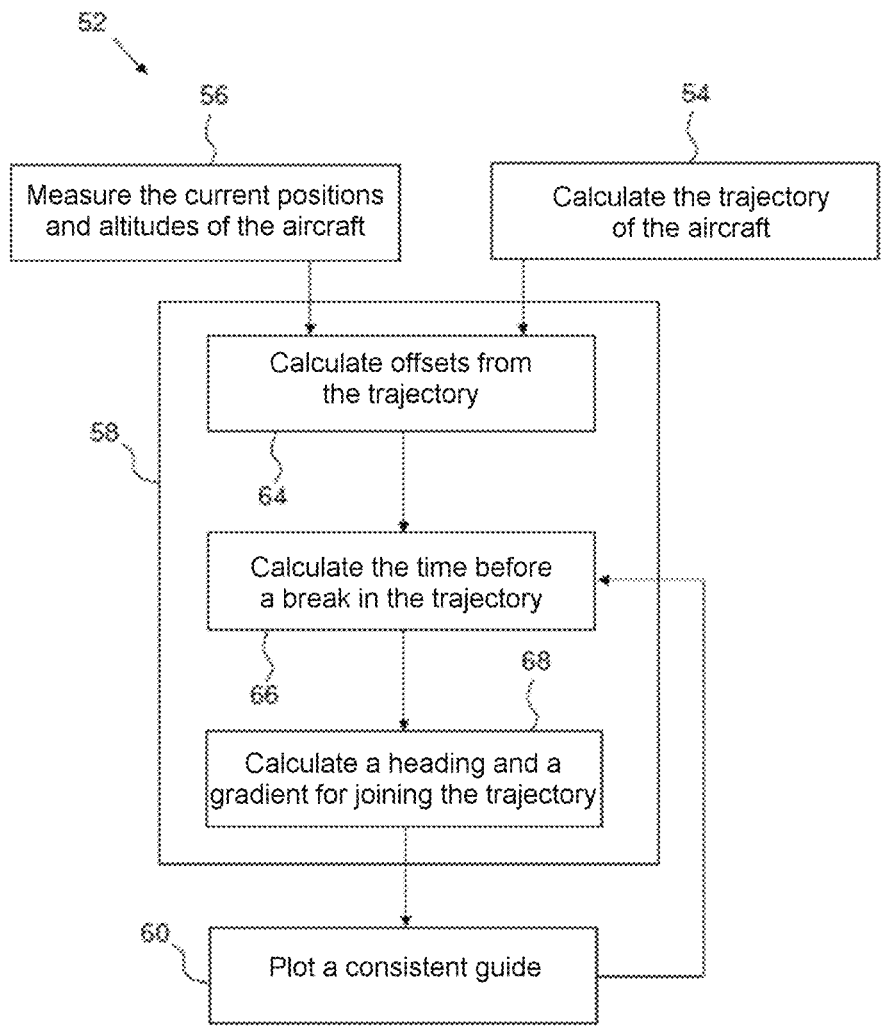
FIG. 2 is a general flowchart of a method according to the invention for guidance and for assisting in following a trajectory for velocity-vector piloting.

According to FIG. 2, a method 52 according to the invention for guidance and for assisting in following a trajectory for velocity-vector piloting of an aircraft is implemented by the guidance and following assistance system 2 of FIG. 1.

The method 52 for guidance and for assisting in following the trajectory of the aircraft 4 comprises the following steps:
 a first step 54 of determining a target trajectory of the aircraft through calculation;
 a second step 56 of measuring the kinematics of the aircraft with respect to the ground, in particular the position of the aircraft with respect to the ground at all times; and then
 a third step 58 of calculating lateral and vertical offsets of the current position of the aircraft 4 from this trajectory, a joining heading and a joining gradient for the aircraft to join this trajectory; and then
 a fourth step 60 of displaying, in head-up or head-down form, a consistent guidance symbol centered on the calculated joining heading and the calculated joining gradient for joining the trajectory, on a piloting screen showing a velocity vector.

The third step 58 comprises a first sub-step 64, a second sub-step 66, and a third sub-step 68 that are executed in succession.

In the first sub-step 64, the guidance computer 18 calculates lateral and vertical offsets of the aircraft from the target trajectory.

In the second sub-step 66, the guidance computer 18 calculates the remaining time before the next break in the trajectory, a break in the trajectory being in the set formed by a start of a turn, an end of a turn, a turn radius and/or direction change, a gradient change on its own or in combination with a lateral heading change.

In the third sub-step 68, the guidance computer 18 calculates a joining heading and a joining gradient for the aircraft to join the trajectory depending on the lateral offset and the vertical offset from the trajectory, calculated at all times in the first sub-step 64.

The target trajectory, determined in the first sub-step 64, for example by a flight management system FMS, installed a priori in the aircraft, is a three-dimensional trajectory in space.

For example, this trajectory consists of a sequence of rectilinear segments and circular arcs, each of the ends of the segments and circular arcs being defined in space by a latitude, a longitude and an altitude, the centers and radii of the circular arcs also being known. It should however be noted that more complex trajectories may be contemplated.

Figure 3:
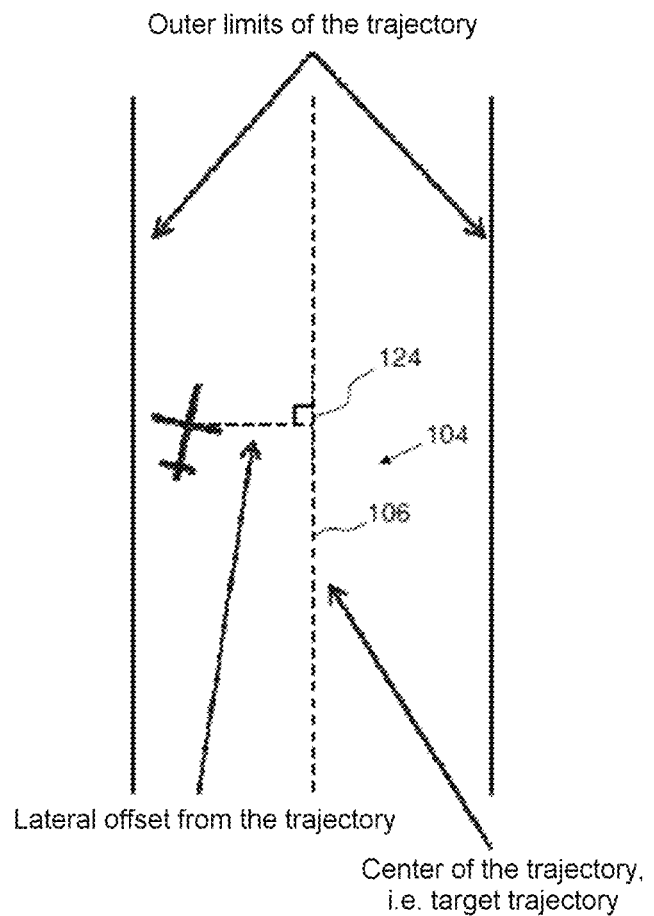
FIG. 3 is a geometrical view of the lateral offset of the aircraft from a straight-line portion or section in the trajectory.
Figure 4:
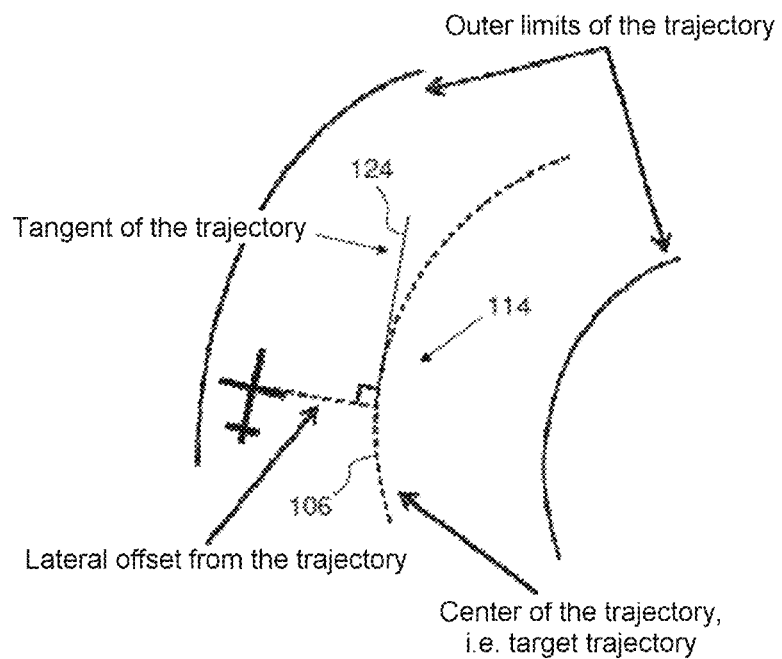
FIG. 4 is a geometrical view of the offset of the aircraft from a portion or section forming a turn in the trajectory.
Figure 5:
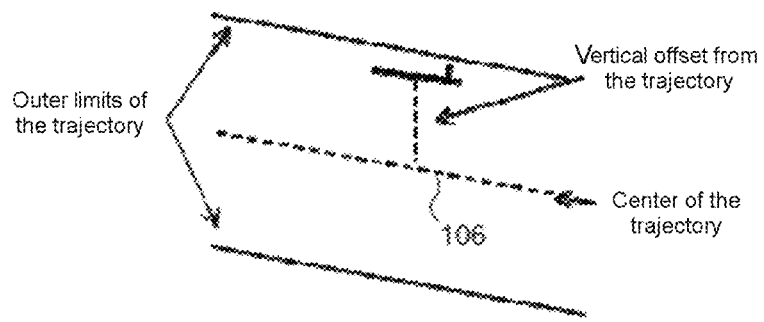
FIG. 5 is a geometrical view of the vertical offset of the aircraft from the trajectory.

It should be noted that the lateral and vertical offsets of the aircraft from the trajectory are calculated in the first sub-step 64 in the plane perpendicular to the trajectory passing through the aircraft. The lateral offset 102, hereinafter denoted "EcartLateral", is illustrated in FIG. 3 in the case in which the aircraft follows a straight-line portion 104 of the trajectory 106 calculated by the FMS, and illustrated in FIG. 4 in the case in which the aircraft 4 follows a curved portion 114, in this case turning to the right, of the trajectory 106 calculated by the FMS. The vertical offset 122, hereinafter denoted "EcartVertical", is illustrated in FIG. 5.

In the case, given by way of example, in which the trajectory consists of a sequence of rectilinear segments and circular arcs, the distance between the aircraft and the terminal end of the current segment or circular arc of the trajectory is calculated in the second sub-step 66. This distance may be used to calculate the remaining time before the next break in the trajectory in the same sub-step 66.

In the case, given by way of example, in which the trajectory consists of a sequence of rectilinear segments and circular arcs, the lateral and vertical offsets make it possible to calculate a joining heading and a joining gradient for joining the trajectory, for example using the following first and second formulae.

In the first formula, expressed by the first equation:

$$Cap_{Rej} = Cap_{Des} + \left(Angle_{Max} \times \operatorname{Tanh}\left(\frac{EcartLateral}{CoefA}\right)\right) \quad [\text{Math. 1}]$$

$Cap_{Rej}$ denotes the joining heading, $Cap_{Des}$ denotes the desired heading, that is to say the heading of the current segment of the trajectory, in the case of a straight-line portion of the trajectory, or the heading of the tangent 124 of the desired trajectory (FIG. 4), for the circular arc portions, that is to say a curved portion of the trajectory, $Angle_{Max}$ denotes the maximum angle at which it is authorized to join the trajectory, for example 45°, and Tanh (.) denotes the hyperbolic tangent function, CoefA is a constant for more or less smoothing the joining turn lateral to the trajectory.

In the second formula, expressed by the equation:

$$Pente_{Rej} = Pente_{Des} + \left(Pente_{Max} \times \operatorname{Tanh}\left(\frac{EcartVertical}{CoefB}\right)\right) \quad [\text{Math. 2}]$$

$Pente_{Rej}$ denotes the joining gradient, $Pente_{Des}$ denotes the desired gradient, that is to say the gradient of the current element of the trajectory (rectilinear segment or circular arc), $Pente_{Max}$ denotes the maximum additional gradient to the desired gradient that is authorized to join the trajectory, for example 15°, Tanh (.) denotes the hyperbolic tangent function, and CoefB denotes a constant for more or less smoothing the joining curvature vertical to the trajectory.

The constants used in these first and second formulae are parameters that vary depending on the type of aircraft, a helicopter, a transport plane or a fighter plane, and on the desired type of piloting, for example for passenger transport with relatively wide turns for joining the trajectory or for a fighter plane with narrower turns.

According to FIG. 2, the two continuously updated values of the joining heading and of the joining gradient make it possible at all times to position, on the primary piloting screen 12, for example a PFD (Primary Flight Display) on a head-down screen, a head-up screen HUD (Head Up Display) or else a head-worn display screen HWD, a single guidance symbol consistent with a synthetic vision system SVS displayed on the primary piloting screen in head-down form or with the real world on head-up displays, and allowing the pilot to position the velocity vector symbol in order to follow or join the calculated trajectory.

According to FIG. 2, at a predefined time T, between 5 seconds and 10 seconds and adjusted depending on the type of aircraft, before the next break in the trajectory, i.e. a break from the set formed by a start of a turn, an end of a turn, a turn radius and/or direction change, a gradient change on its own or in combination with a lateral heading change, the single guidance symbol, still centered on the calculated joining heading and the calculated joining gradient as described above, becomes the additional information carrier allowing the pilot to anticipate the following element of the trajectory with great accuracy. This additional information is displayed in the fourth step 60 and allows the pilot to ascertain:

the exact moment of the trajectory break, and/or the future direction of displacement of the guidance symbol; and/or the future displacement velocity of the guidance symbol; and/or the turn exit heading when the following sequence is a turn; and/or the gradient of the following sequence of the trajectory; and/or the roll angle to be taken in the following sequence of the trajectory.

The system and the method according to the invention for guidance and for assisting in following the calculated target trajectory thus follow the calculated trajectory with great accuracy by virtue of the provision of velocity-vector piloting that follows a consistent guidance symbol, and the provision of additional guidance information that makes it possible to anticipate each future movement of the aircraft without any surprises.

It should be noted that the calculation of the remaining time before the next break in the trajectory, executed in the second sub-step 66, uses the distance between the aircraft and the terminal end of the current rectilinear segment or circular arc of the trajectory, calculated beforehand in the same second sub-step 66, and the velocity of the aircraft, with respect to the ground, measured in the second step 56.

Figure 6:
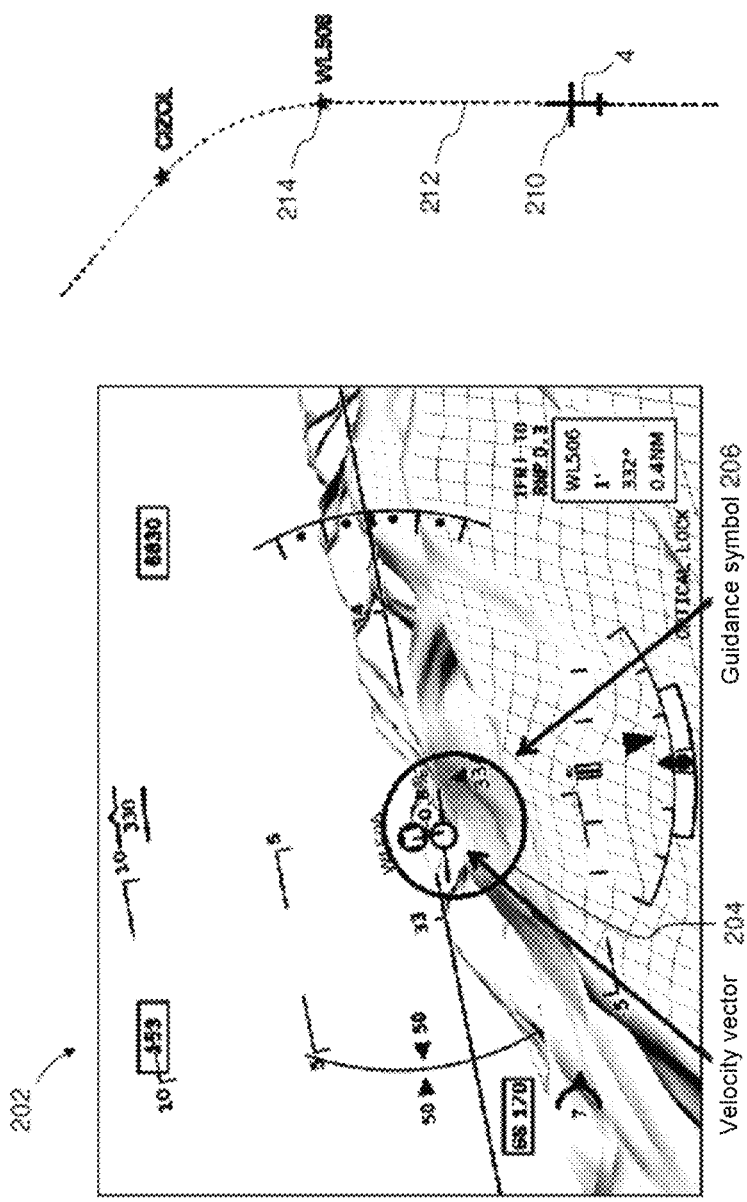
FIG. 6 is a view of the guidance symbol displayed when it is in a first complete configuration of a circular object and corresponding to a position of the aircraft, situated in a rectilinear portion of the trajectory outside of an area of anticipation of a next break to a next turn.
Figure 7:
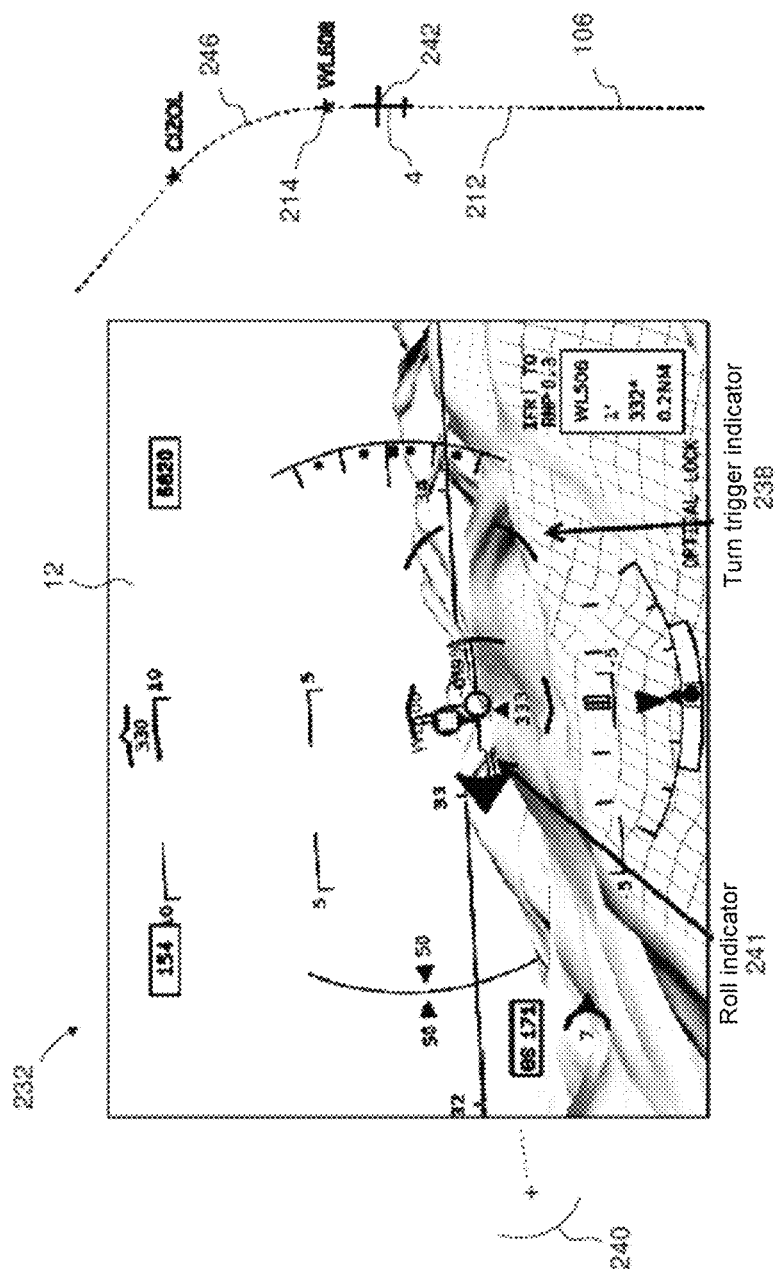
FIG. 7 is a view of the guidance symbol, displayed when it is in a second exploded configuration of a circular object, and corresponding to a position of the aircraft, situated in a rectilinear portion of the trajectory and within the area of anticipation of a next break to a next turn.
Figure 8:
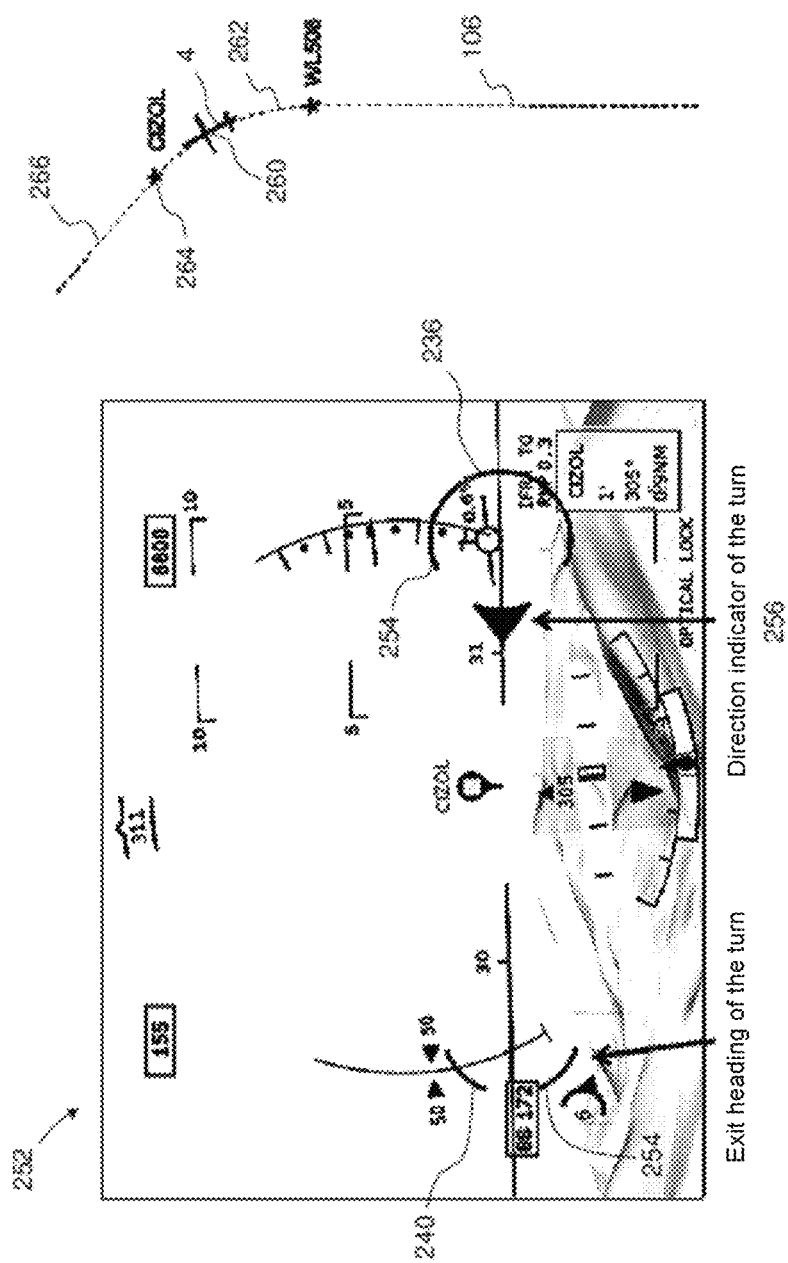
FIG. 8 is a view of the guidance symbol, displayed when it is in a third semi-exploded configuration of a circular object and corresponding to a position of the aircraft, situated in a curved portion of the trajectory outside of an area of anticipation of a next break to a next turn or within an area of anticipation of a next break to a next rectilinear segment.

According to FIGS. 6, 7 and 8 and one particular mode of implementation of the guidance symbol, when the aircraft passes through a rectilinear portion to a curved portion of the trajectory, the guidance symbol has a shape derived from a circular object with a diameter greater than the width of the velocity vector, so as to allow the pilot to place the velocity vector within the guidance symbol in order to follow and join the trajectory.

The circular object has three states or configurations depending on the temporal position of the aircraft with respect to the next break in the trajectory when the following element or the following section in the trajectory is a turn.

According to FIG. 6 and a first state of the circular object, illustrated in a first display representation 202, the circular object 204 is in one piece and coincident with the guidance symbol 206. This first display state in which the guidance symbol has the shape of a complete closed circle arises when the remaining time before the next break is greater than a predetermined time or period T, between 5 seconds and 10 seconds before the next break. The position 210 of the aircraft 4 on the rectilinear section 212 of the trajectory 106 before the break 214, in this case the waypoint WL506, is an example corresponding to this first state.

According to FIG. 7 and a second state of the circular object, illustrated in a second display representation 232, the circular object 234 is exploded into three exploded sets:

a first exploded set 236 formed of circular arcs of a first half of the circular object, forming the guidance symbol and centered on the point for joining the trajectory;

a second exploded set 238, formed of circular arcs of the first half of the circular object, complementary to the circular arcs of the first exploded set, moved in translation from the first set in a direction opposite the entry point of the next turn by a distance D at the time T in advance of the break, and activated with the future displacement velocity of the guidance symbol during the next turn;

a third exploded set 240, formed partly or completely of the circular arcs of the second half of the circular object, complementary to the first half of the circular object, centered on the exit point of the next turn and the concavity of which faces the concavity of the first exploded set.

This second display state in which the guidance symbol has the shape of circular arcs over a first half of a circle arises when the remaining time before the next break is between T and 0 and the next section of the trajectory is a turn.

Between the time T before the next trajectory break and the trajectory break, the guidance symbol 236 is plotted according to the second exploded depiction, centered on the current joining point, whereas the third exploded set 240 is plotted centered on the gradient and the exit heading of the next turn, and the second exploded set 240 moves by a distance D to 0 for the time T at the future displacement velocity of the guidance symbol during the next turn. The activation of this second exploded set of arcs 238 gives the pilot information about the future turn rate and thus makes it possible to view the exact moment or to modify the turn rate that corresponds to the joining of the second exploded state 238 with the guidance symbol 236 in the case of a new future turn or to the joining of the third exploded set 240 with the guidance symbol 236 in the case of an end of a turn. In addition, in this depiction, a roll angle instruction 241 is added in support of the guidance symbol 236 corresponding to the following sequence of the trajectory, in order to allow the pilot to anticipate the future roll angle to be adopted in the following sequence. This instruction is also consistent with the velocity vector. If the following sequence is a turn, the arrow showing the direction of the future turn is also displayed on the guidance circle.

The position 242 of the aircraft 4 on the rectilinear section 212 of the trajectory 106 before the break 214, in this case the waypoint WL506, to the curved section 246, is an example corresponding to this second state.

It should be noted that the third exploded set 240, centered on the exit of the next future turn, is not visible on the piloting screen 12 as it is too far away from the exit of the next turn with respect to the size of the field of view able to be displayed.

According to FIG. 8 and a third state of the circular object, illustrated in a third display representation 252, the circular object 254 is half-exploded into two parts:

the first and second exploded sets 236, 238 combined in the first half of the circular object, forming the guidance symbol and centered on the point for joining the trajectory and the concavity of which is oriented toward the exit point of the next turn; and the third exploded set 240 centered on the exit point of the next turn and the concavity of which faces the concavity of the first exploded set.

This third display state in which the guidance symbol has the shape of an open circle and the complementary part of the guidance symbol is the third exploded set 240 centered on the gradient and the exit heading of the current turn arises when the current element of the trajectory is a curved portion and when the remaining time before the next break is greater than T or the next future element of the trajectory is a rectilinear segment. An arrow 256 to the guidance circle is then added, showing the direction of the turn.

The position 260 of the aircraft 4 on the curved section 262 of the trajectory 106 before the next break 264, in this case the waypoint CIZOL, to a rectilinear segment 266, is an example corresponding to this third state.

The invention claimed is:

1. A method for guidance and for assisting in following a trajectory for velocity-vector piloting of an aircraft, the guidance and following assistance method comprising the following steps:
   a first step of determining a target trajectory of the aircraft;
   a second step of measuring a current position and a current attitude of the aircraft; and then
   a third step of calculating lateral and vertical offsets of the current position of the aircraft from the target trajectory, a joining heading and a joining gradient for the aircraft to join the target trajectory; and then
   a fourth step of displaying, in head-up or head-down form, a consistent guidance symbol centered on the calculated joining heading and the calculated joining gradient for joining the target trajectory, on a piloting screen showing a velocity vector;
   wherein the target trajectory of the aircraft has one or more trajectory breaks from by one or more of a set formed by: a start of a turn, an end of a turn, a turn radius, a direction change, a gradient change, and a lateral heading change; and
   the third step calculates a remaining time before a next trajectory break, and the fourth step displays, in addition to the guidance symbol, first information anticipating the next trajectory break with regard to the remaining time until the next trajectory break as calculated in the third step when the calculated remaining time passes values less than a predetermined period T.

2. The method for guidance and for assisting in following a trajectory as claimed in claim 1, wherein the fourth step displays, in support of the guidance symbol, second information anticipating the next trajectory break with regard to a direction of displacement of the guidance symbol after the next trajectory break when the calculated remaining time passes a value less than the predetermined period T.

3. The method for guidance and for assisting in following a trajectory as claimed in claim 1, wherein
   the fourth step displays, in support of the guidance symbol, third information anticipating the next trajectory break with regard to a displacement velocity of the guidance symbol after the next trajectory break when the calculated remaining time passes a value less than the predetermined period T.

4. The method for guidance and for assisting in following a trajectory as claimed in claim 1, wherein
   the fourth step displays, in support of the guidance symbol, fourth information anticipating the next trajectory break with regard to the gradient to be taken after the next trajectory break when the calculated remaining time passes a value less than the predetermined period T.

5. The method for guidance and for assisting in following a trajectory as claimed in claim 1, wherein
   the fourth step displays, in support of the guidance symbol, fifth information anticipating the next trajectory break with regard to a roll angle to be taken after the next trajectory break when the calculated remaining time passes a value less than the predetermined period T.

6. The method for guidance and for assisting in following a trajectory as claimed in claim 1, wherein
the guidance symbol has an unbroken or broken shape of a ring with a diameter greater than a width of the velocity vector.

7. The method for guidance and for assisting in following a trajectory as claimed in claim 1, wherein
when the next trajectory break is in the set formed by a start of a turn, a turn radius and/or direction change, the fourth step displays, in addition to the guidance symbol, fifth information anticipating the next trajectory break with regard to a heading to be taken after the next trajectory break when the calculated remaining time passes a value less than the predetermined period T.

8. The method for guidance and for assisting in following a trajectory as claimed in claim 1, wherein
when the next trajectory break is in the set formed by a start of a turn, a turn radius and/or direction change, the fourth step displays first information anticipating an exact moment of the next trajectory break by activating an auxiliary symbol for indicating a calculated remaining time, created on the screen when the calculated remaining time passes a value less than the predetermined period T, activated on the screen with a consistent lateral displacement velocity equal to a future displacement velocity V of the guidance symbol during the next turn, and situated on the screen, when it appears when the calculated remaining time is equal to T, at a distance D from a position of the guidance symbol that is equal to the product of the velocity V and the duration T.

9. The method for guidance and for assisting in following a trajectory as claimed in claim 1, wherein
when the next trajectory break is in the set formed by a start of a turn, a turn radius and/or direction change, the guidance symbol has a shape that varies depending on a calculated remaining time,
the shape of the guidance symbol being a full circle when the calculated remaining time is greater than the predetermined period T; and
the shape of the guidance symbol being a broken circular arc having a concavity which is oriented toward an exit position of the next turn when the calculated remaining time passes the period T by lower values until being canceled out, a first auxiliary symbol being created in parallel, having a shape complementary to the broken circular arc of the guidance symbol and activated with a consistent lateral displacement velocity equal to a future displacement velocity V of the guidance symbol, and a second auxiliary symbol being created in parallel, centered on the exit position of the next turn.

10. The method for guidance and for assisting in following a trajectory as claimed in claim 1, wherein
the first step is executed by a flight management system;
the second step is executed by a set of positioning and attitude sensors;
the third step is executed by an electronic guidance computer; and
the fourth step is executed by a head-down or head-up piloting screen contained in an SVS, EVS, CVS display system.

11. A system for guidance and for assisting in following a trajectory for velocity-vector piloting of an aircraft, comprising:
a flight management system of the aircraft, a set of positioning and attitude sensors of the aircraft, a set of at least one display including a piloting screen of the aircraft, and a guidance computer for assisting manual piloting of the aircraft;
the flight management system being configured so as to determine and provide a target trajectory of the aircraft;
the set of position and attitude sensors being configured so as to provide kinematics of the aircraft to the guidance computer at all times;
the guidance computer being configured so as to calculate, at all times, lateral and vertical offsets of a current position of the aircraft from the target trajectory, a joining heading and a joining gradient for the aircraft to join the target trajectory from the current position of the aircraft and the target trajectory;
the piloting screen showing a velocity vector being configured so as to display a consistent guidance symbol, centered on the calculated joining heading and calculated joining gradient for joining the target trajectory;
the system being wherein the target trajectory of the aircraft has one or more trajectory breaks from one or more of a set formed by: a start of a turn, an end of a turn, a turn radius, a direction change, a gradient change, and a lateral heading change;
the guidance computer is configured so as to calculate the remaining time before the next break, and
the control screen is configured so as to display, in addition to the guidance symbol:
first information anticipating a next trajectory break with regard to the remaining time until the next trajectory break calculated when the calculated remaining time passes a value less than a predetermined period T; and/or
second information anticipating the next trajectory break with regard to the direction of displacement of the guidance symbol after the next trajectory break when the calculated remaining time passes a value less than the predetermined period T; and/or
third information anticipating the next trajectory break with regard to the displacement velocity of the guidance symbol after the next trajectory break when the calculated remaining time passes a value less than the predetermined period T; and/or
fourth information anticipating the next trajectory break with regard to the gradient to be taken after the next trajectory break when the calculated remaining time passes a value less than the predetermined period T.

12. The system for guidance and for assisting in following a trajectory as claimed in claim 11, wherein
the control screen is configured so as to display, in support of the guidance symbol, fifth information anticipating the next trajectory break with regard to the heading to be taken after the next trajectory break when the calculated remaining time passes a value less than the predetermined period T when the next trajectory break is in the set formed by a start of a turn, a turn radius and/or direction change; and/or
when the next trajectory break is in the set formed by a start of a turn, a turn radius and/or direction change, the first information anticipating an exact moment of the next trajectory break is created by activating an auxiliary symbol indicating the calculated remaining time, created on the screen when the calculated remaining time passes values less than the predetermined period T, activated on the screen with a consistent lateral displacement velocity equal to a future displacement velocity V of the guidance symbol during the next turn, and situated on the screen, when it appears when the calculated remaining time is equal to T, at a distance D from a position of the guidance symbol that is equal to the product of the velocity V and the duration T.

* * * * *